United States Patent

Lowdon

[11] Patent Number: 5,974,326
[45] Date of Patent: Oct. 26, 1999

[54] SYSTEM AND METHOD FOR CHANNEL ALLOCATION IN A RADIO TELEPHONE SYSTEM FOR AN UNDERGROUND RAILWAY

[75] Inventor: Christopher John Lowdon, Impington, United Kingdom

[73] Assignee: Nokia Telecommunications Oy, Espoo, Finland

[21] Appl. No.: 08/875,850

[22] PCT Filed: Oct. 22, 1996

[86] PCT No.: PCT/GB96/02591

§ 371 Date: Aug. 6, 1997

§ 102(e) Date: Aug. 6, 1997

[87] PCT Pub. No.: WO97/23059

PCT Pub. Date: Jun. 26, 1997

[30] Foreign Application Priority Data

Dec. 19, 1995 [GB] United Kingdom .................. 9525942

[51] Int. Cl.[6] ............................................ H04Q 7/20
[52] U.S. Cl. ................... 455/450; 455/422; 455/447; 455/562
[58] Field of Search .................................. 455/422, 432, 455/436, 446, 447, 450, 451, 452, 453, 509, 464, 561, 562

[56] References Cited

U.S. PATENT DOCUMENTS

| | | | |
|---|---|---|---|
| 5,212,830 | 5/1993 | Miller | 455/562 |
| 5,432,780 | 7/1995 | Smith et al. | 455/562 |
| 5,491,833 | 2/1996 | Hamabe | 455/562 |
| 5,649,292 | 7/1997 | Doner | 455/447 |
| 5,722,043 | 2/1998 | Rappaport et al. | 455/447 |
| 5,724,666 | 3/1998 | Dent | 455/562 |
| 5,742,911 | 4/1998 | Dumbrill et al. | 455/562 |
| 5,787,344 | 7/1998 | Scheinert | 455/447 |
| 5,812,956 | 9/1998 | Pregont | 455/562 |
| 5,835,859 | 11/1998 | Doner | 455/450 |

FOREIGN PATENT DOCUMENTS

| | | |
|---|---|---|
| 0 531 090 | 3/1993 | European Pat. Off. . |
| WO 92/20197 | 11/1992 | WIPO . |

OTHER PUBLICATIONS

39TH VEHICULAR TECHNOLOGY CONFERENCE, May 1–3, 1989, "Radio in the London Underground", Martin et al., pp. 375–382, vol. 1, IEEE.

Primary Examiner—Dwayne D. Bost
Assistant Examiner—Nay A. Maung
Attorney, Agent, or Firm—Perman & Green, LLP

[57] ABSTRACT

A radio telephone system is installed in an underground railway system. The telephone system has base stations A, B at respective railway stations 1, 2 and the base stations serve leaky cables serving the railway stations and further cables extending along the tunnel bores interconnecting the railway stations. To improve the availability of channels available as station calls to users of mobile radios within the areas of the railway stations, switches 20 are incorporated to prevent any channel occupied as a station call being directed into the cable serving the tunnel. This enables channels allocated as train call channels at one base station to be re-used as station call channels at an adjacent base station.

9 Claims, 2 Drawing Sheets

SYSTEM AND METHOD FOR CHANNEL ALLOCATION IN A RADIO TELEPHONE SYSTEM FOR AN UNDERGROUND RAILWAY

BACKGROUND OF THE INVENTION

1. Field of the Invention

This invention relates to channel allocation in a radio telephone system having base stations with which mobile radios are in radio communication.

2. Description of the Related Art

The invention addresses a limitation in conventional channel allocation whereby radio channels cannot be re-used by adjacent base stations due to the interfering radio coverage zones, even when mobile radios are not operating in those zones. There are radio systems where a proportion of the mobile radios are always located in such isolated areas that the channels used by them can be re-used in neighbouring areas. For instance, at in an underground railway system (where radio base stations are located at each railway station) there can be such radio isolation at the railway stations. However, this isolation does not exist in tunnels interconnecting the railway stations because in the tunnels the radiating cables of the two adjacent base stations meet. If it is necessary to allocate a channel for use in a tunnel it is important that this channel is not re-used on the adjacent cable since this would cause interference and malfunction of the mobile radio roaming technique. Therefore, the use of the channel for a call in a tunnel would normally preclude its re-use at the next railway station even though the mobile radio user may only require radio coverage within the railway station area. This is wasteful of radio channels and the aim of the invention is to improve the efficiency of channel allocation.

BRIEF SUMMARY OF THE INVENTION

According to one aspect of the invention there is provided a radio telephone system comprising at least a first base station A having two antennas for communicating with a mobile radio in areas $\alpha$ and $\beta$ respectively and a second base station B having two antennas for communicating with a mobile radio in areas $\gamma$ and $\delta$ respectively, wherein a first set of channels is allocated to the first base station A, the first set of channels including a channel C$\alpha$ for serving area a and a channel C$\beta$ for serving area $\beta$, and a second set of channels is allocated to the second base station B, the second set of channels including a channel C$\gamma$ for serving area $\gamma$ and a channel C$\delta$ for serving area $\delta$, areas $\beta$ and $\delta$ being in radio interference over an interference zone, characterised in that channel C$\delta$ is additionally allocated to the first base station A to serve area $\alpha$ and the first base station A has first discriminating means which are operative to detect a call on channel C$\delta$ in area $\alpha$ and to prevent the channel thus occupied being directed to the antenna serving area $\beta$, and wherein channel C$\beta$ is additionally allocated to the second base station to serve area $\gamma$ and the second base station has second discriminating means which are operative to detect a call on channel C$\beta$ in area $\gamma$ and prevent the channel thus occupied being directed to the antenna serving area $\delta$. The antennas are preferably lossy or leaky cables, eg coaxial cables.

For example, in an underground railway system, the two base stations A and B are located at adjacent railway stations, area $\alpha$ serving one railway station and area $\gamma$ serving another railway station B. Areas $\beta$ and $\delta$ are the lengths of tunnel interconnecting the railway stations. A train carrying an antenna makes train calls by communicating with radio fields set up by the cables serving areas $\beta$ and $\delta$, ie the tunnels. A person carrying a mobile radio makes station calls by communicating with the radio fields set up by cables serving areas $\alpha$ and $\gamma$.

By recourse to the invention channel allocation can be shown by the following table:

|  | Base Station A | Base Station B |
| --- | --- | --- |
| Station Call Channels | C$\alpha$, C$\delta$ | C$\gamma$, C$\beta$ |
| Train Call Channels | C$\beta$, | C$\delta$ |

Thus, the invention increases channel availability for station calls by adding channel C$\delta$ to the channel(s) available for station calls at the base station A, and adds channel C$\beta$ for station calls at base station B.

Because areas $\alpha$ and $\gamma$ serving the respective railway stations do not interfere, channel C$\gamma$ can be further allocated to the first base station A to serve area $\alpha$ and channel C$\alpha$ can be further allocated to the second base station B to serve area $\gamma$. Hence, the above table can be amended to illustrate this improved channel availability for station calls as follows:

|  | Base Station A | Base Station B |
| --- | --- | --- |
| Station Call Channels | C$\alpha$, C$\delta$, C$\gamma$ | C$\gamma$, C$\beta$, C$\alpha$ |
| Train Call Channels | C$\beta$, | C$\delta$ |

According to another aspect of the invention there is provided a method of allocating channels in a radio telephone system comprising at least a first base station A having two antennas for communicating with a mobile radio in areas $\alpha$ and $\beta$ respectively and a second base station B having two antennas for communicating with a mobile radio in areas $\gamma$ and $\delta$ respectively, wherein a first set of channels is allocated to the first base station A, the first set of channels including a channel C$\alpha$ for serving area $\alpha$ and a channel C$\beta$ for serving area $\beta$ and a second set of channels is allocated to the second base station, the second set of channels including a channel C$\gamma$ for serving area $\gamma$ and a channel C$\delta$ for serving area $\delta$ areas $\alpha$ and $\gamma$ being in radio isolation, areas $\alpha$ and $\beta$ being in radio interference, areas $\gamma$ and $\delta$ being in radio interference and areas $\beta$ and $\delta$ being in radio interference, characterised in that channel C$\delta$ is additionally allocated to the first base station A to serve area $\alpha$ and the first base station A detects when a call is made on channel C$\delta$ in area $\alpha$ and prevents the channel thus occupied being directed to the antenna serving area $\beta$, and wherein channel C$\beta$ is additionally allocated to the second base station to serve area $\gamma$ and the second base station detects when a call is made on channel C$\beta$ in area $\gamma$ and prevents the channel thus occupied being directed to the antenna serving area $\delta$.

The foregoing refers to channels being allocated to base stations. It should be borne in mind that the radio telephone system is dynamic and that certain channels may be allocated to certain base stations for a short time period only: the allocation of channels to particular base stations can be thought of as a condition representing a particular "snapshot" in time. It follows that a channel having a particular frequency may be allocated to one base station at one moment in time and to another base station at another moment in time.

BRIEF DESCRIPTION OF THE SEVERAL VIEWS OF THE DRAWINGS

A radio telephone system according to the invention will now be described by way of example with reference to the accompanying drawings, in which.

DETAILED DESCRIPTION OF THE INVENTION

Figure 1:
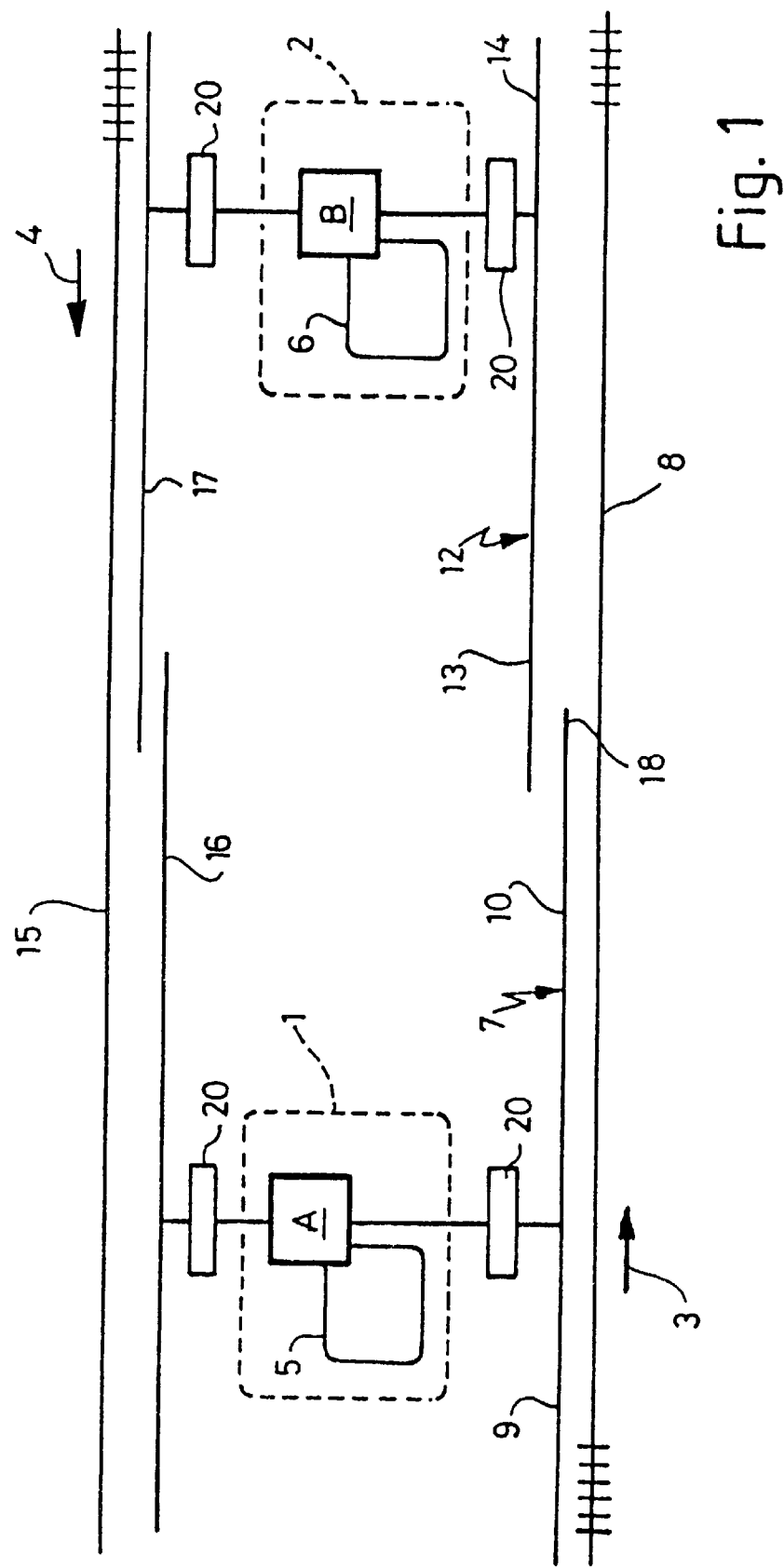
FIG. 1 is a diagram of the system installed in an underground railway system.

Referring to FIG. 1, two successive railway stations on an underground railway line are indicated at 1 and 2. The railway stations have respective base stations A and B which are similar to base stations in a cellular radio system in that each base station is linked, generally by hard wiring, to a telephone exchange. The base stations A and B have respective cable loops 5 and 6 which extend around the areas of the railway stations (eg platforms, subways and concourse) so that people equipped with mobile handsets can make and receive telephone calls through the respective base stations A and B. It is envisaged that the people equipped with the necessary mobile handsets will be station personnel, security personnel or similarly authorised people, but it is possible for the radio telephone system to be accessible to members of the public provided with the usual cellular radio handsets.

The base station A also feeds a radiating cable 7 which extends along the tunnel bore linking the stations 1 and 2. The bore accommodates a single length of railway track 8 along which trains normally run in the same direction, indicated by arrow 3. The cable 7 has a first portion 9 extending from the station 1 towards the preceding railway station and a second portion 10 extending from the station 1 towards the next station 2. Similarly, the base station B feeds a second cable 12 within the bore, the cable 12 having a first portion 13 extending towards the station 1 and a second portion 14 extending towards the next railway station along the line. The cables 5, 6, 7 and 12 are leaky or lossy in that they radiate radio fields corresponding to the electrical signals from the respective base stations A and B. A radio interference zone extends over the length of tunnel bore centred on where the cables 7 and 12 overlap. The cables 7 and 12 are supported by hangers on the walls of the bore so that the cables 7 and 12 extend longitudinally within the bore accommodating the track 8 along which the trains pass (in direction 3) from the station 1 to the station 2. A second tunnel bore accommodating a second railway track 15 is provided to take trains in the opposite direction 4 from the station 2 to the station 1, this second tunnel bore accommodating leaky cables 16 and 17 respectively fed from the base stations A and B.

A train travelling along the railway track 8 is equipped with a mobile radio and has, on the front of the train, an antenna which detects the radio field set up by the nearby cable 7 or 12. As the train proceeds from the railway station 1 to the railway station 2 the strength of the first radio field radiated from the cable 7 (and consequently the magnitude of the signal detected by the mobile radio) will gradually decrease. When the front of the train passes the extremity 18 of the cable 7, the signal strength will drop below the roaming threshold which is the magnitude of received signal strength below which the mobile radio commences its routine to initiate call handover to another base station. Hence, as the train passes the end 18 of the cable 7 any call from the mobile radio on the train will be transferred to the cable 12 and will occupy an available channel at the next base station B.

If ten channels are available then according to the applicants' "Actionet" system it would be necessary to allocate five channels to base station A and five channels to base station B. Of the five channels at each base station one is a control channel, two are station call channels and two are train call channels. Let the area at the station 1 served by base station A be designated α. Let the area served by the cable 7 be designated β. Let the area at the station 2 served by base station B be designated γ. Let the area served by cable 12 be designated δ. Straightforward channel allocation is shown in the following table:

|  | Base Station A | Base Station B |
| --- | --- | --- |
| Control Channel | CA | CB |
| Station Call Channels | Cα1, Cα2 | Cγ1, Cγ2 |
| Train Call Channels | Cβ1, Cβ2 | Cδ1, Cδ2 |

However, a station call at station 1 does not interfere with a station call at station 2. Any interference in the tunnel, resulting in the signals being fed into the cable 7 or 12 is of no consequence because the calls are geographically restricted to areas α and γ which are not in radio interference. Hence, channels Cγ1 and Cγ2 can be additionally allocated to station call channels at base station A, and channels Cα1 and Cα2 can be additionally allocated to station call channels at base station B. This improves channel availability as follows:

|  | Base Station A | Base Station B |
| --- | --- | --- |
| Control Channel | CA | CB |
| Station Call Channels | Cα1, Cα2, Cγ1, Cγ2 | Cγ1, Cγ2, Cα1, Cα2 |
| Train Call Channels | Cβ1, Cβ2 | Cδ1, Cδ2 |

Channel availability for station calls is further improved by the invention which enables the channels to be re-used for station calls even if the channel is in use in the tunnel served by the adjacent base station. Radio zone switching is used to isolate the radio signal from the tunnel in those cases where the call is identified as a station call. This is done by discriminating means including a switch 20 incorporated in the base station or interposed between each base station A, B and each cable 7, 12, 16, 17 as indicated diagrammatically in FIG. 1.

In this way, the interference and disruption to the mobile roaming is avoided, enabling train call channels at one base station to be allocated as station call channels at an adjacent base station. By recourse to the invention channel availability for station calls is enhanced as shown by the following table:

|  | Base Station A | Base Station B |
| --- | --- | --- |
| Control Channel | CA | CB |
| Station Call Channels | Cα1, Cα2, Cγ1, Cγ2 Cδ1, Cδ2 | Cγ1, Cγ2, Cα1, Cα2 Cβ1, Cβ2 |
| Train Call Channels | Cβ1, Cβ2 | Cδ1, Cδ2 |

There are several forms of circuitry by which the radio zone can be isolated. Two circuits are described as examples and respectively illustrated in FIGS. 2 and 3.

Figure 2:
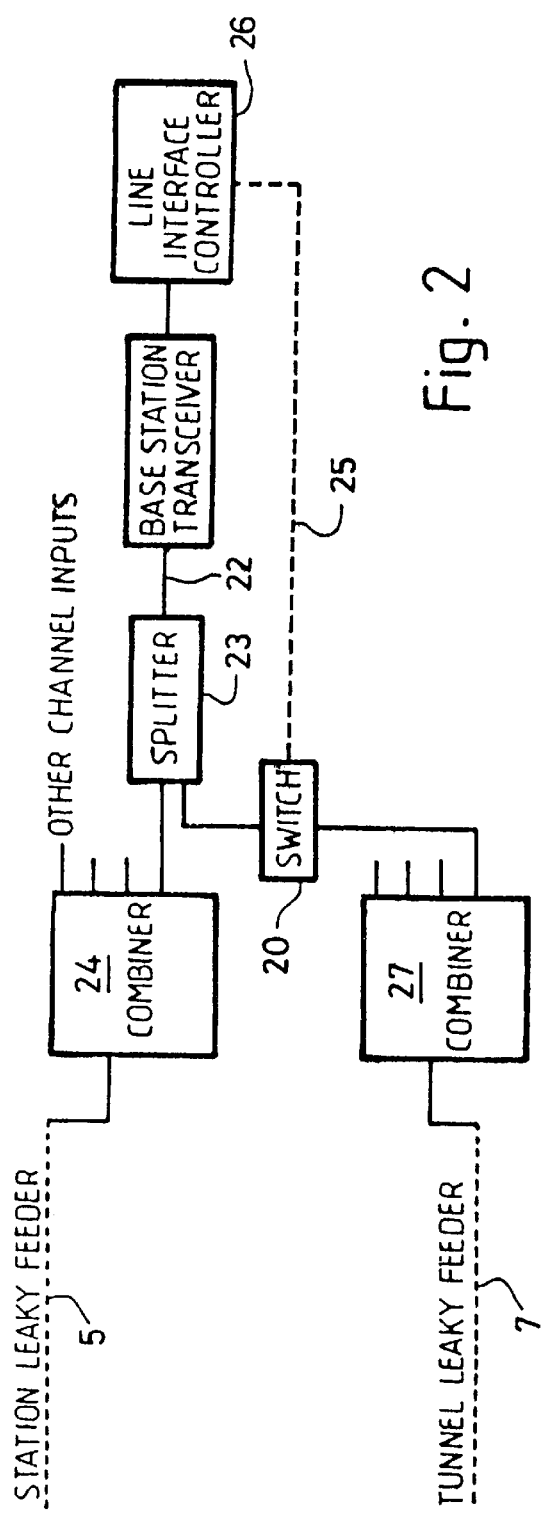
FIG. 2 is a block circuit diagram of part of a system at one railway station of the system.

Referring to FIG. 2, which shows base station A by way of example, the output signal 22 of each base station channel unit is first split in a splitter 23, one part being fed to a combiner 24 used to feed the station cable 5. The other part is fed to the switch 20 which is in the form of a PIN diode switch. The switch 20 is activated by a control signal 25 derived from a line interface controller 26 of the base station A. The signal 25 is generated from the software condition which exists when the call is known to be a station call, ie a call initiated by a mobile radio within area α. Hence, when a station call is made the line interface controller 26 sends the control signal 25 to the switch 20 which ensures that the channel thus occupied is not directed to the combiner 27 serving the cable 7. This enables the channel to be re-used by the next base station as a station call channel without risk of interference, in the manner previously described.

Figure 3:
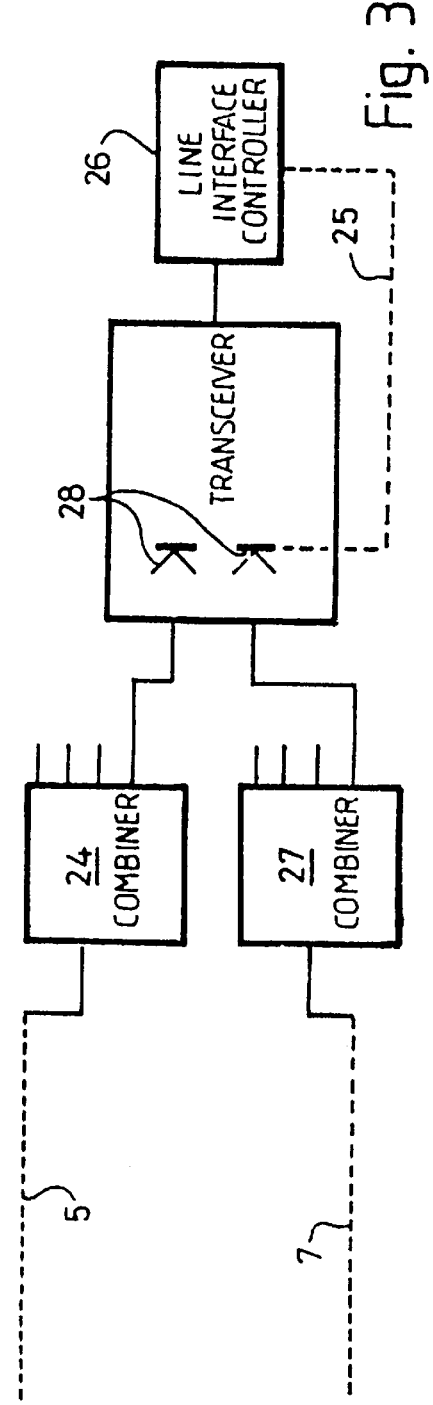
FIG. 3 is a block circuit diagram of a modification of the circuitry of FIG. 2.

In the modification of FIG. 3, the division and control of the signal paths as described with reference to FIG. 2 are achieved within the transmitter of the base station A. In order to do this the parallel output circuits of a power amplifier of the transmitter are modified so that two discrete outputs are provided and individually switched by two transistors which together constitute the switch 20. In order to control the signal to the tunnel one of the output circuits is turned on or off by a control signal 25 derived from the line interface controller 26, in a manner comparable to that described with reference to FIG. 2.

It will be appreciated that in both of the arrangements of FIGS. 2 and 3 separate combiners 24 and 27 are necessary to serve the cables 5 and 7 respectively.

The described arrangements have the following advantages:

Channels available for station calls are greatly increased

Channels can be re-used across exchange boundaries so the invention can be used at interchange stations served by several operating lines which may be served by base stations connected to different telephone exchanges. This is possible because a base station does not need any information or intelligence about what is happening at another base station: it merely needs the discriminating means to isolate the relevant station call channels from the tunnel cables.

I claim:

1. A radio telephone system comprising: at least a first base station A having two antennas for communicating with a mobile radio in areas α and β respectively and a second base station B having two antennas for communicating with a mobile radio in areas γ and δ respectively, wherein a first set of channels is allocated to the first base station A, the first set of channels including a channel Cα for serving area α and a channel Cβ for serving area β and a second set of channels is allocated to the second base station B, the second set of channels including a channel Cγ for serving an area γ and a channel Cδ for serving area δ, areas β and δ being in radio interference over an interference zone, characterised in that channel Cδ is additionally allocated to the first base station A to serve area α and the first base station A has first discriminating means which are operative to detect a call on channel Cδ in area α and to prevent the channel thus occupied from being directed to the antenna serving area β, and wherein channel Cβ is additionally allocated to the second base station to serve area γ and the second base station has second discriminating means which are operative to detect a call on channel Cβ in area γ and prevent the channel thus occupied from being directed to the antenna serving area δ.

2. A radio telephone system according to claim 1, wherein channel Cγ is further allocated to the first base station to serve area α, the channel Cα is further allocated to the second base station to serve area γ.

3. A radio telephone system according to claim 1, wherein the first discriminating means includes a first switch operative to prevent any channel occupied by a mobile radio in area α being directed to the antenna serving area β when the first switch receives from line interface means of the first base station a signal indicative of any such channel being occupied, and wherein the second discriminating means include a second switch operative to prevent any channel occupied by a mobile radio in area γ being directed to the antenna serving area δ when the second switch receives from line interface means of the second base station a signal indicative of any such channel being occupied.

4. A radio telephone system according to claim 1, wherein the first set of channels include a plurality of channels Cβ1, Cβ2, which serve area β and which are additionally allocated to the second base station to serve area γ and the second discriminating means are operative to detect a call on any one of channels Cβ1, Cβ2, and to prevent the channel thus occupied from being directed to the antenna serving area δ.

5. A radio telephone system according to claim 4, wherein the second set of channels include a plurality of channels Cδ1, Cδ2, which serve area δ and which are additionally allocated to the first base station to serve area α and the first discriminating means are operative to detect a call on any one of channels Cδ1, Cδ2, and to prevent the channel thus occupied from being directed to the antenna serving are β.

6. A radio telephone system according to claim 1, wherein the antenna for serving areas α and γ are leaky feeders for serving respective localised areas which do not interfere.

7. A radio telephone system according to claim 6, wherein the antenna for serving areas β and δ are leaking feeders for placement such that there is interference over said interference zone.

8. A radio telephone system according to claim 6 and fitted in an underground railway system, the base stations A and B being respectively located at adjacent railway stations, area α serving the first railway station and area γ serving the second railway station, the antennas serving areas β and δ extending along a tunnel bore interconnecting the two railway stations, the two antennas serving areas β and δ overlapping over a length of tunnel bore constituting the interference zone.

9. A method of allocating channels in a radio telephone system comprising: at least a first base station A having two antennas for communicating with a mobile radio in areas α and β respectively and a second base station B having two antennas for communicating with a mobile radio in areas γ and δ respectively, wherein a first set of channels is allocated to the first base station A, the first set of channels including a channel Cα for serving area α and a channel Cβ for serving area β and a second set of channels is allocated to the second base station B, the second set of channels including a channel Cγ for serving an area γ and a channel Cδ for serving area δ, areas α and γ being in radio isolation, areas α and β being in radio interference, areas γ and δ being in radio interference and areas β and δ being in radio interference over an interference zone, characterised in that channel Cδ is additionally allocated to the first base station A to serve area α and the first base station A detects when a call is made on channel Cδ in area α and prevents the channel thus occupied from being directed to the antenna serving area β and wherein channel Cβ, is additionally allocated to the second base station to serve area γ and the second base station detects when a call is made on channel Cβ in area γ and prevents the channel thus occupied from being directed to the antenna serving area δ.

* * * * *